US006655658B2

(12) United States Patent
Neal et al.

(10) Patent No.: US 6,655,658 B2
(45) Date of Patent: Dec. 2, 2003

(54) PLUG VALVE ASSEMBLY AND FLUID FLOW CONTROL METHOD WITH IMPROVED LOW PRESSURE SEALING

(75) Inventors: Kenneth G. Neal, Duncan, OK (US); Gregory A. Hall, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 161 days.

(21) Appl. No.: 10/075,329

(22) Filed: Feb. 14, 2002

(65) Prior Publication Data

US 2003/0151016 A1 Aug. 14, 2003

(51) Int. Cl.[7] ............................ F16K 5/14; F16K 5/18
(52) U.S. Cl. ....................................... 251/309; 251/356
(58) Field of Search ........................ 251/309–312, 251/314–317.01, 313, 356

(56) References Cited

U.S. PATENT DOCUMENTS

| 2,813,695 | A |   | 11/1957 | Stogner ..................... 251/159 |
|-----------|---|---|---------|--------------------------------------|
| 2,954,961 | A |   | 10/1960 | Stogner et al. ............. 251/312 |
| 3,133,722 | A |   | 5/1964  | McGuire et al. ............ 251/309 |
| 3,974,869 | A | * | 8/1976  | Abe et al. ................... 251/309 |
| 4,113,228 | A | * | 9/1978  | Frye .......................... 251/309 |
| 4,796,858 | A | * | 1/1989  | Kabel ......................... 251/314 |
| 5,154,396 | A | * | 10/1992 | Conley et al. .............. 251/309 |
| 5,226,445 | A |   | 7/1993  | Surjaatmadja ......... 137/516.29 |
| 6,012,702 | A | * | 1/2000  | Heimberger ............... 201/309 |

* cited by examiner

Primary Examiner—Paul J. Hirsch
(74) Attorney, Agent, or Firm—John W. Wustenberg; Warren B. Kice

(57) ABSTRACT

A plug valve and fluid control method according to which a cylindrical plug is provided in a bore of a body member and has a through passage formed therein. The plug is adapted to be rotated about its axis to move the passage between an open position in which it is in alignment with passages in the body member to permit fluid flow through the body member, and a closed position in which it is out of alignment with the passages to prevent the fluid flow.

22 Claims, 3 Drawing Sheets

PLUG VALVE ASSEMBLY AND FLUID FLOW CONTROL METHOD WITH IMPROVED LOW PRESSURE SEALING

This invention relates to a plug valve assembly for controlling the flow of a high pressure fluid.

Plug valve assemblies are well known in the art and feature a valve member rotatably mounted in a body member and having a through opening which can be positioned relative to two aligned passages in the body member to control the fluid flow through the body member.

Inserts are often provided between the valve member and the corresponding surfaces in the body member to provide an intimate sealing contact with the valve member. These inserts vary in shape and some are provided with tapered outer surfaces while others extend parallel to the corresponding inner surface of the body member. A disadvantage of the tapered inserts is that their sealability is less than optimum since the inserts may preferentially conform to the body member causing a small gap between the mating surfaces of the valve member and the inserts. A disadvantage of inserts with outside diameters parallel to the inside diameter of the plug valve body is that they require the valve assemblies to be disassembled in the event of a leak.

DETAILED DESCRIPTION

Figure 1:
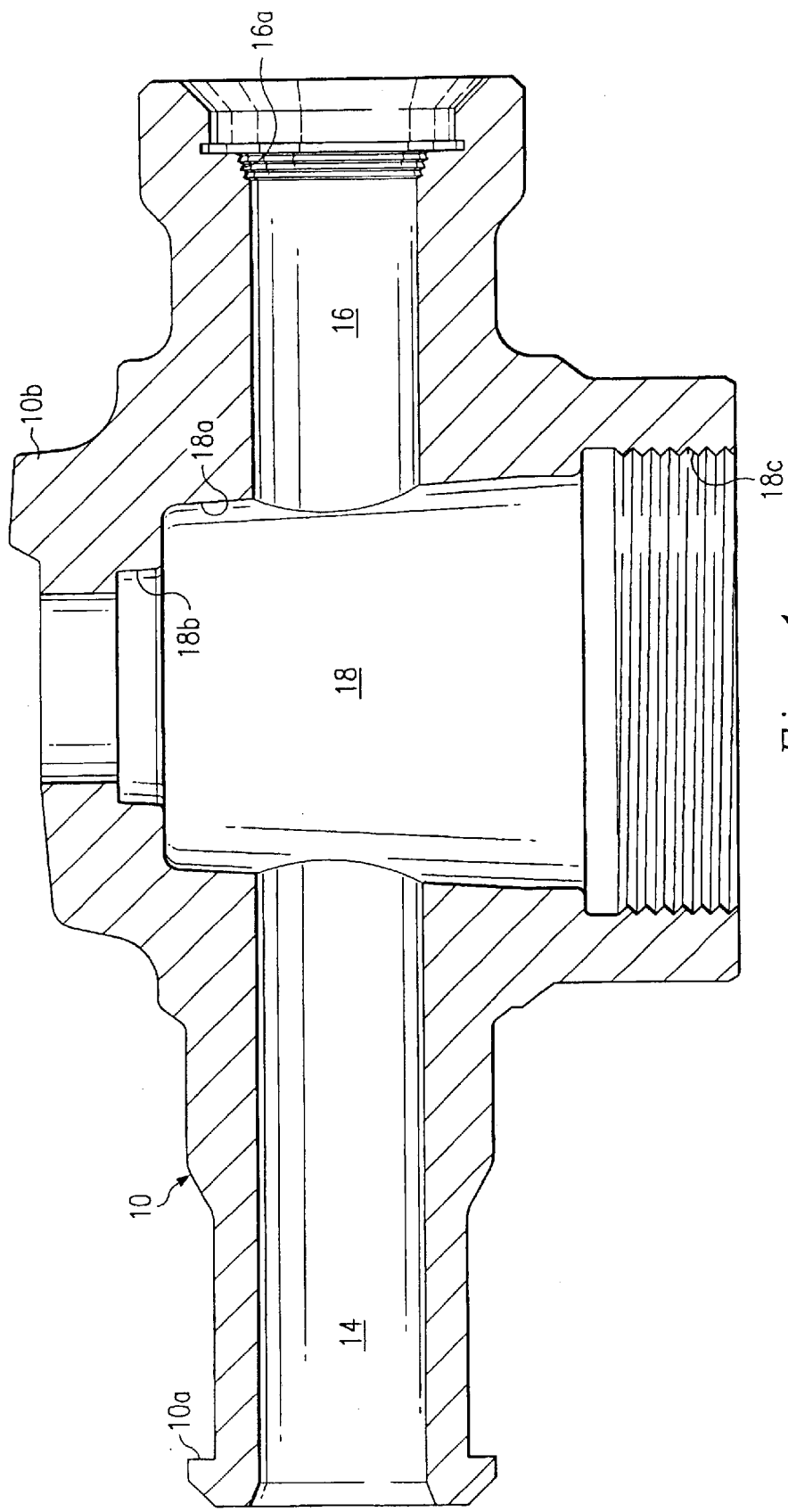
FIG. 1 is a sectional view of a body member of a plug valve assembly according to an embodiment of the present invention.

With reference to FIG. 1 of the drawing, the reference numeral 10 refers, in general, to a body member, which has two axially spaced, coaxially aligned, passages 14 and 16 and a bore 18 that extends perpendicular to the passages 14 and 16. The bore 18 has a central section 18a that is tapered slightly, a reduced-diameter section 18b extending above the central section 18a as viewed in FIG. 1, and an internally threaded section 18c extending below the central section 18a. A flange 10a is formed on the body member 10 at the end of the passage 14 to enable the passage to be connected to a source of fluid; and the distal end portion of the passage 16 is internally threaded, as shown at 16a, to permit connection to a conduit, or the like (not shown), for receiving the fluid.

Figure 2:
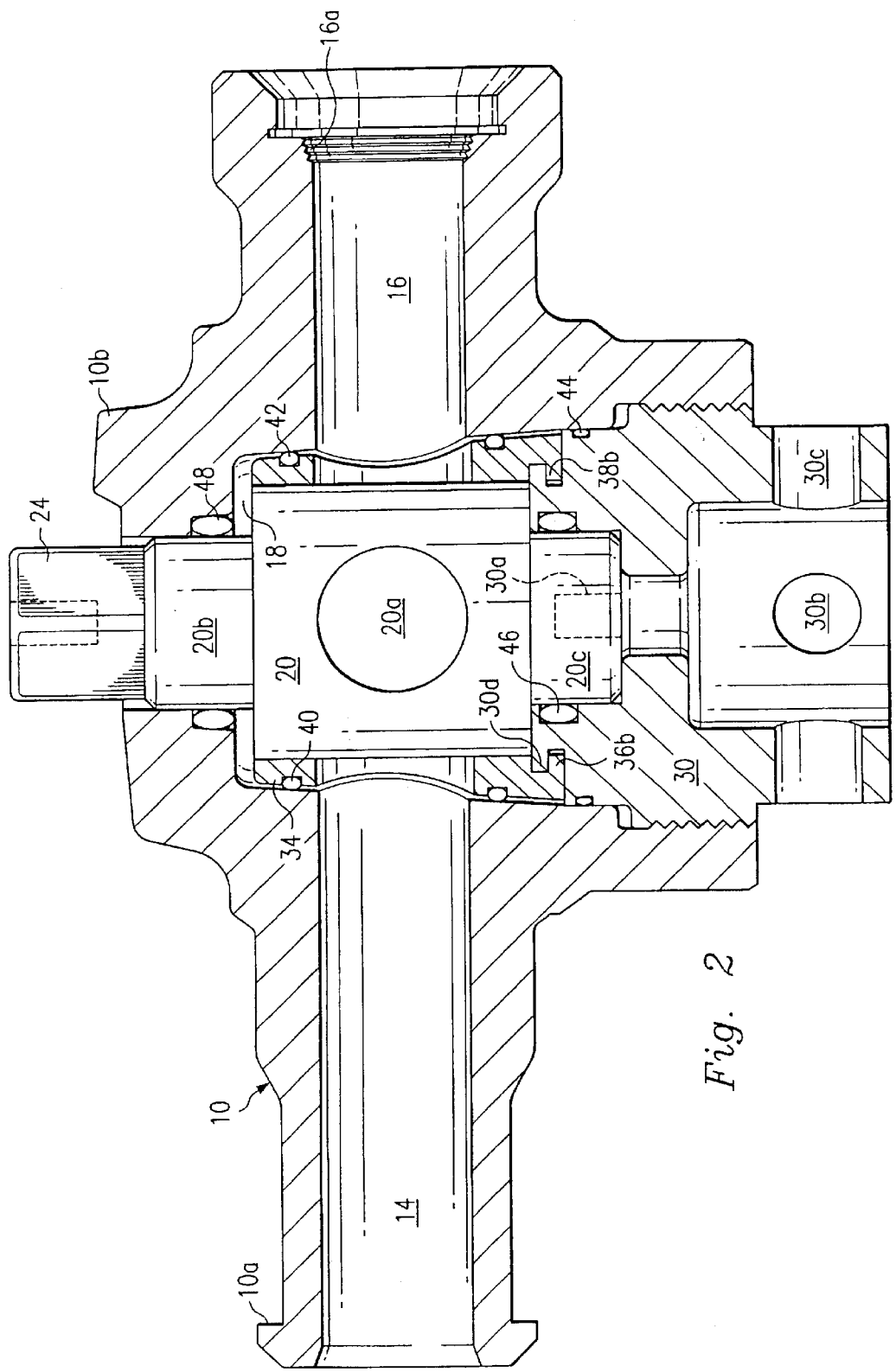
FIG. 2 is a sectional view of the complete plug valve assembly according to the above embodiment of the present invention.

As shown in FIG. 2, a cylindrical plug 20 is rotatably mounted in the bore 18, and has a through passage 20a extending perpendicular to its axis. The plug 20 is adapted to be rotated about its axis in a manner to be described to move the passage 20a between an open position in which it is in alignment with the passages 14 and 16 to permit fluid flow though the body member 10, and a closed position in which it is out of alignment with the passages 14 and 16 to prevent the fluid flow.

A stem 20b extends from the upper end of the plug 20 as viewed in FIG. 2, and into the reduced-diameter section 18b; and a stem 20c extends from the lower end of the plug 20. A hexagonal plug 24 is connected to the upper end of the stem 20b in any conventional manner and is adapted to be manually rotated to rotate the plug 20 in the manner described above. To aid in this rotation, a conventional handle mechanism (not shown) can be placed over the hexagonal plug 24 which includes at least one handle that can be used to manually rotate the hexagonal plug 24, and therefore the plug 20. In this context, a stop 10b is formed on the upper surface of the body member 10 to limit the movement of the above handle in one direction, and another stop (not shown) is also formed on the body member 10 to prevent rotation of the handle in an opposite direction.

An adjustment nut 30 is disposed in the bore 18 and has an externally threaded portion that extends in the internally-threaded section 18c in threaded engagement with the corresponding threads defining the internally-threaded section 18c. A cylindrical recess is formed in the upper portion of the adjustment nut 30 which receives the stem 20c of the plug 20, and a stem 30a is formed in the latter recess and extends into a corresponding axial opening in the lower surface of the stem 20c. The stem 20c and the stem 30a provide axial and radial alignment of the plug 20 and the adjustment nut 30, while permitting rotation of plug 20 relative to the adjustment nut 30.

The adjustment nut 30 has two internal, radially-extending, passages 30b and 30c extending perpendicular to each other for receiving a handle, rod, or the like (not shown), to enable manual rotation of the adjustment nut 30, which causes it to move axially in the body member 10 for reasons to be described.

Figure 3:
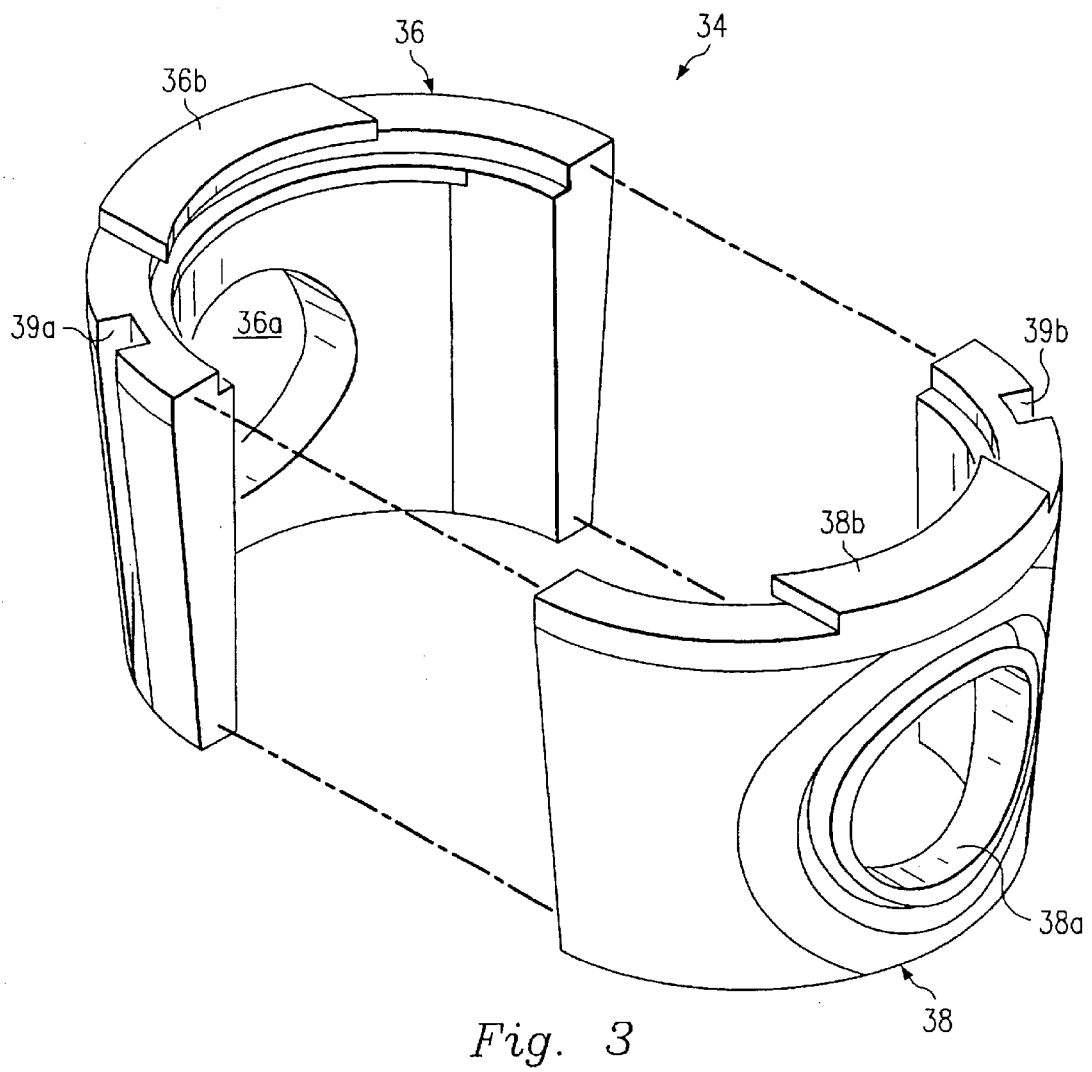
FIG. 3 is an isometric view of a component of the above embodiment of the present invention.

As shown in FIGS. 2 and 3, an insert 34 is provided around the plug 20 and extends between the outer surface of the plug 20 and the corresponding inner surface of the central section 18a. The insert 34 is formed by two semi-circular insert sections 36 and 38 (FIG. 3) each of which extends for approximately 180 degrees around the corresponding surfaces of the plug 20. The respective outer surfaces of the insert sections 36 and 38 are slightly tapered in a radial direction which tapers are complementary to the tapered wall of the body member 10 forming the central section 18a (FIG. 1). The insert sections 36 and 38 have through openings 36a and 38a, respectively, formed therethrough which register with the passages 14 and 16, respectively, and the passage 20a of the plug 20 when the latter is in its open position, as discussed above.

Two radially extending, inwardly directed, lips 36b and 38b (FIGS. 2 and 3) are formed on the insert sections 36 and 38, respectively. The lips 36b and 38b extend circumferentially for approximately 40 degrees and interlock with a corresponding annular lip 30d on the upper portion of the adjustment nut 30 (FIG. 2). In this context, the insert 34 is shown upside down in FIG. 3 to better depict the lips 36b and 38b.

Two axially extending grooves 39a and 39b are formed in the outer surfaces of the insert sections 36 and 38, respectively, for receiving pins (not shown), or the like, in the bore 18 to locate the openings 36a and 38a relative to the passages 14 and 16, respectively, and to prevent rotation of the insert 34 relative to the body member 10.

Referring to FIG. 2, two seals 40 and 42 extend in circumferential grooves formed in the outer surfaces of the insert sections 36 and 38 and around the openings 36a and 38a through the insert sections 36 and 38, and engage the corresponding inner surfaces of the body member 10. A seal 44 extends in a groove formed in an outer surface of the adjustment nut 30 and engages the corresponding inner surface of the body member 10, and a seal 46 extends in a groove in the inner surface of the adjustment nut 30 and engages the corresponding outer surface of the stem 20c. A seal 48 extends between the outer surface of the stem 20b and the corresponding inner surface of body member 10. The seals 40 and 42 seal against any fluid leakage between the insert 34 and the corresponding surfaces of the body member 10, the seal 44 seals against any fluid leakage between the adjustment nut 30 and the corresponding surface of the body member 10, the seal 46 seals against any fluid leakage between the stem 20c and the corresponding surface of the adjustment nut 30, and the seal 48 seals against any fluid leakage between the stem 20b and the corresponding surface of the body member 10.

The interlocking engagement of the lips 36b and 38b of the insert sections 36 and 38 with the annular lip 30d of the adjustment nut 30 maintain an alignment of the insert sections 36 and 38 in the central section 18a. The clearances between the lips 36b and 38b and the adjustment nut 30 are enough to allow the insert sections 36 and 38 to freely float and reposition themselves to maintain a good fit against the plug 20, but not enough to allow them to move far enough where they could wedge between the plug 20 and the body member 10 which could cause high operating torque.

As shown in FIG. 2, at relatively low pressures, the outer surfaces of the insert sections 36 and 38 do not contact the corresponding surfaces of the body member 10 defining the bore 18, and the seals 40 and 42 provide the force required to press the insert sections 36 and 38 against the plug 20. In this context, the seals 40 and 42 are compressed more than what is required to seal and thus become a spring in addition to a seal.

The adjustment nut 30 functions to locate the insert sections 36 and 38 so that the seals 40 and 42, along with the differential fluid pressure in the passages 14 and 16, apply the forces required to insure that the insert sections 36 and 38 are in intimate sealing contact with the plug 20. It is noted that the adjustment nut 30 can be rotated as described above, to compensate for wear of the insert sections 36 and 38 in service.

The plug valve assembly of the above embodiment thus enjoys the advantages of optimum low pressure sealability yet can easily be adjusted in the event of a leak.

It is understood that variations may be made in the foregoing without departing from the scope of the invention. For example, the passage 14 can serve as an outlet passage and the passage 16 can serve as an inlet passage. Also, one or more members, other than the seals 40 and 42, can be provided to apply the spring force to press the insert sections 36 and 38 against the plug 20. For example, these members can be in the form of springs, or the like. Further, spatial references, such as "upper," "lower," "around," "radially," "axially," etc., are for the purpose of illustration only and do not limit the specific orientation or location of the structure described above.

Since other modifications, changes, and substitutions are intended in the foregoing disclosure, it is appropriate that the appended claims be construed broadly and in a manner consistent with the scope of the invention.

What is claimed is:

1. A plug valve assembly comprising:
   a body member having an inlet passage for receiving fluid, an outlet passage for discharging the fluid, and a bore;
   a plug disposed in the bore and having a through passage formed therein so that the plug can be rotated about its axis to move the through passage between an open position in which it is in alignment with the inlet and outlet passages to permit fluid flow through the body member, and a closed position in which it is out of alignment with the inlet and outlet passages to prevent the fluid flow; and
   at least one tapered insert disposed between the outer surface of the plug and the corresponding portion of the wall of the body member defining the bore, the tapered insert being in sealing engagement with the plug and extending out of contact with the body member at relative low pressures of the fluid.

2. The plug valve assembly of claim 1 wherein, at relatively high fluid pressures, the tapered insert engages the corresponding portion of the body member.

3. The plug valve assembly of claim 1 further comprising at least one sealing member extending between the tapered insert and the body member to apply a force against the tapered insert to force it into the sealing engagement with the plug at the relative low pressures.

4. The plug valve assembly of claim 3 further comprising a nut in threaded engagement with a portion of the bore and adapted to apply a force against the tapered insert.

5. The plug valve assembly of claim 4 wherein the axial position of the nut is adjustable to locate the tapered insert so that the sealing member applies a force against the tapered insert to urge the tapered insert into intimate sealing contact with the plug.

6. The plug valve assembly of claim 1 wherein the plug is cylindrical and wherein there are two tapered inserts disposed between the outer surface of the plug and the corresponding portion of the wall of the body member, each tapered insert extending for approximately 180 degrees around the outer surface of the plug.

7. A plug valve assembly comprising:
   a body member having an inlet passage for receiving fluid, an outlet passage for discharging the fluid, and a bore;
   a plug disposed in the bore and having a through passage formed therein so that the plug can be rotated about its axis to move the through passage between an open position in which it is in alignment with the inlet and outlet passages to permit fluid flow through the body member, and a closed position in which it is out of alignment with the inlet and outlet passages to prevent the fluid flow;
   at least one tapered insert disposed between the outer surface of the plug and the corresponding portion of the wall of the body member defining the bore; and
   means extending between the tapered insert and the body member for applying a force against the tapered insert to force the tapered insert into engagement with the plug.

8. The plug valve assembly of claim 7 wherein the force-applying means comprises a sealing member.

9. The plug valve assembly of claim 7 further comprising a nut in threaded engagement with a portion of the bore and adapted to apply a force against the tapered insert.

10. The plug valve assembly of claim 9 wherein the axial position of the nut is adjustable to locate the tapered insert so that the sealing member applies a force against the tapered insert to urge the tapered insert into intimate sealing contact with the plug.

11. The plug valve assembly of claim 7 wherein the tapered insert is constructed and arranged so that it contacts the body member at relatively high fluid pressures and does not contact the body member at relative low fluid pressures.

12. The plug valve assembly of claim 7 wherein the plug is cylindrical and wherein there are two tapered inserts disposed between the outer surface of the plug and the corresponding portion of the wall of the body member, each tapered insert extending for approximately 180 degrees around the outer surface of the plug.

13. A method of controlling fluid flow comprising:

introducing fluid into an inlet passage of a body member;

providing a plug disposed in a bore of the body member and having a through passage formed therein so that the plug can be rotated about its axis to move the through passage between an open position in which it is in alignment with the inlet passage to permit fluid flow through the body member, and a closed position in which it is out of alignment with the inlet passage to prevent the fluid flow; and providing at least one tapered insert between the outer surface of the plug and the corresponding portion of the wall of the body member defining the bore, the tapered insert being in sealing engagement with the plug and extending out of contact with the body member at relative low pressures of the fluid.

14. The method of claim 13 wherein, at relatively high fluid pressures, the tapered insert engages the corresponding portion of the body member.

15. The method of claim 14 further comprising locating a sealing member between the tapered insert and the body member to apply a force against the tapered insert to force it into the sealing engagement with the plug at the relative low pressures.

16. The method of claim 15 further comprising providing a nut in threaded engagement with a portion of the bore for applying a force against the tapered insert.

17. The method of claim 16 further comprising adjusting the axial position of the nut to locate the tapered insert so that the sealing member applies a force against the tapered insert to urge the tapered insert into intimate sealing contact with the plug.

18. A method of controlling fluid flow comprising:

introducing fluid into an inlet passage of a body member;

providing a plug disposed in a bore of the body member and having a through passage formed therein so that the plug can be rotated about its axis to move the through passage between an open position in which it is in alignment with the inlet passage to permit fluid flow through the body member, and a closed position in which it is out of alignment with the inlet passage to prevent the fluid flow;

providing at least one tapered insert between the outer surface of the plug and the corresponding portion of the wall of the body member defining the bore; and applying a force against the tapered insert to force the tapered insert into engagement with the plug at the relative low pressures.

19. The method of claim 18 wherein the step of applying force comprises locating a sealing member between the tapered insert and the body member.

20. The method of claim 19 further comprising providing a nut in threaded engagement with a portion of the bore for applying a force against the tapered insert.

21. The method of claim 20 further comprising adjusting the axial position of the nut to locate the tapered insert so that the sealing member applies a force against the tapered insert to urge the tapered insert into intimate sealing contact with the plug.

22. The method of claim 18 wherein the tapered insert contacts the body member at relatively high fluid pressures and does not contact the body member at relative low fluid pressures.

* * * * *